Dec. 29, 1931.  J. B. SPERRY  1,839,126
IMPELLER
Filed May 17, 1929  5 Sheets-Sheet 1

Inventor
John B. Sperry

Dec. 29, 1931.  J. B. SPERRY  1,839,126
IMPELLER
Filed May 17, 1929   5 Sheets-Sheet 3

Inventor
John B. Sperry

Witness

Dec. 29, 1931.   J. B. SPERRY   1,839,126
IMPELLER
Filed May 17, 1929      5 Sheets-Sheet 4

Inventor
John B. Sperry

Witness

Dec. 29, 1931.    J. B. SPERRY    1,839,126
IMPELLER
Filed May 17, 1929    5 Sheets-Sheet 5

Witness
William P. Kilroy

Inventor
John B. Sperry
By Brown, Jackson, Boettcher & Dienner Attys.

Patented Dec. 29, 1931

1,839,126

UNITED STATES PATENT OFFICE

JOHN B. SPERRY, OF AURORA, ILLINOIS, ASSIGNOR TO THE AMERICAN WELL WORKS, OF AURORA, ILLINOIS, A CORPORATION OF ILLINOIS

IMPELLER

Application filed May 17, 1929. Serial No. 363,733.

This invention relates to centrifugal pumps particularly adapted for pumping liquid containing solids.

The broad object of the present invention is to provide a novel form of impeller which will be non-clogging.

In handling sewage, drainage and the like, it is necessary to pass through the pump solids carried by the liquid. This includes not only solid particles which may relatively easily be passed but fibrous matter such as rags, grass, roots, paper, pieces of rope and the like. Such fibrous matters have, in impellers of the prior art, caused great trouble by getting caught in the impeller and hindering or stopping the operation of the pump.

I have observed that where two or more passages through the impeller are provided the fibrous matter which often is longer than the diameter of the throat of the pump will become hung across the outlets of one or more passages from the impeller defying dislodgment.

Even if the impeller contains but a single vane, and that as known in the prior art is undesirable because of lack of balance, the fibrous matter may hang over the edge of the same and clog the pump. This is because the vane has flow in the same direction upon both sides of its advancing edge promoting such hanging up or clogging.

Now I have conceived that if a single passage without a divided flow were employed the problem of handling fibrous matter without clogging could be solved.

If the passage discharged at only one point or region into the pump casing clogging might be avoided, but the pump would be relatively inefficient and unbalanced mechanically and dynamically. Pumps of this class are essentially high speed mechanisms to be efficient. The centrifugal force which it is required to develop for pumping is a function of the square of the speed, but so also is the stress produced by an unbalanced mass. Hence, an accurate balance dynamically is highly important.

I have conceived that if the discharge of the single passage could be distributed circumferentially of the impeller the desired non-clogging and balance mechanically and hydraulically could be attained in one and the same structure. Pursuant to this broad concept I have devised a construction of impeller which has a single passage therethrough, the outlet thereof being distributed about the circumference of the impeller so that a substantially evenly balanced discharge about the periphery of the impeller is obtained.

A number of advantages flow from this construction:

1. It is non-clogging;
2. It is substantially balanced hydraulically except for possible axial thrust, and that is not important;
3. It is substantially balanced statically and dynamically, or may readily be made so. In addition, the entire outer surface may be machined without destroying or impairing the action of the device.

In the construction of the impeller I provide means by which it may be balanced without requiring machining or cutting of the active surfaces.

The manner of enclosing the impeller and of supporting and driving the same is not herein shown or claimed, reference being here made to my copending application Serial No. 421,094, filed January 16, 1930, for a full disclosure of the same. Suffice it to say that a suitable cooperative casing is employed which permits of an axial inlet and a peripheral outlet which may be of the snail shell type.

The impeller may be conceived as generated in any one of a number of ways, and in fact a wide variety of constructions within the teachings of the present invention is possible. That is to say, the impellers herein shown embody a number of features of novelty combined together to produce the preferred form, but certain of the features are of themselves new, as will more at length appear, and may be used singly or collectively to secure more or less fully the advantages of my invention.

Now in order to acquaint those skilled in the art with the manner of constructing and operating a device embodying my invention, I shall describe in connection with the accompanying drawings a specific embodiment of the same.

In the drawings:

Figures 17 and 18 explain the generation of the impeller.

Figure 1:
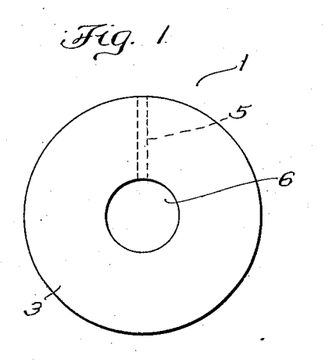
Figures 1 to 10 are diagrams illustrating certain phases of the theory of the impeller.
Figure 2:
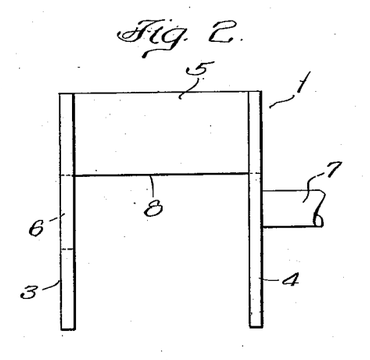
Figure 3:
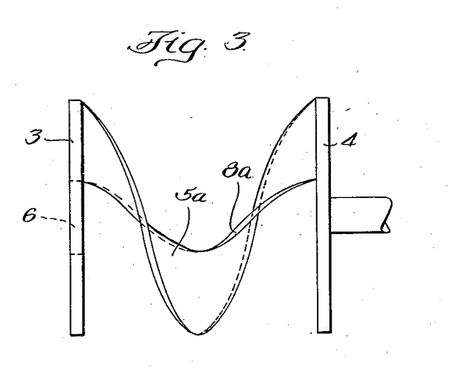

Referring, first, to Figures 1, 2 and 3, assume that an impeller 1, shown in Figures 1 and 2, be disposed in a proper pump casing. This impeller consists of the side plates 3 and 4 and a single connecting vane 5 which if rotated will tend to throw liquid outwardly by centrifugal force. Liquid being permitted to enter by way of the opening 6 in the plate 3 tends to be thrown outwardly radially as the same is moved rotarily by means of the vane 5. Obviously, if more than one vane such as 5 be employed, the efficiency of the impeller may be increased by obtaining a greater hold on the liquid to throw the same out by centrifugal force. The more vanes there are the greater opportunity is there for fibrous matter to become hung in the impeller.

It will be apparent that any solid matter entering the opening 6 and tending to move out radially under the influence of the centrifugal throw created by the vane 5 will tend mainly to flow outward along the vane 5. That is to say, the liquid which is drawn in through the opening 6 will move out partly in front and partly behind the vane 5. If any fibrous matter enters with the liquid it may get caught or hung across the inner edge 8 of the vane 5 and the continued rotation of the pump will not avail to dislodge such fibrous material, particularly if the fibrous material is relatively long so that it overhangs the sides of the vane 5.

The more vanes there are the more opportunity there is for a fibrous solid material to become hung in the impeller, and it may be considered, therefore, that if a single vane would suffice for moving the liquid, it would be preferable to a larger number of vanes since the opportunities for the hanging of fibrous material on the impeller would be thereby lessened.

A single vane impeller, however, would naturally be badly balanced both because of the unbalanced weight mechanically and because of the hydraulic unbalance, since the reaction of the single blade would have no corresponding hydraulic reaction throughout the remainder of the periphery of the impeller.

It is to be observed, also, that a single straight radially disposed vane, as shown in Figures 1 and 2, is not particularly efficient since it does not exert the desired forces upon the water or other liquid. It tends to set up disturbances which impair the efficiency of the pump. Otherwise stated, it is not a stream line device and sets up interfering eddies.

Now in order to avoid unbalance it may be considered that the single vane might be made to throw liquid around the entire periphery by the simple expedient of giving the vane 5 a helical twist, as shown in Figure 3. Consider the helical vane 5a of Figure 3 as generated by merely rotating the plate 4 a complete turn with respect to the plate 3 and warping the vane 5 by such action.

Now it can be seen at once that a circumferentially balanced discharge is secured with a single vane but that the fundamental deficiency of the vane 5 shown in Figures 1 and 2 still persists, namely, that fibrous material can be hung on the inner edge 8a and that the blade still provides only an imperfect hold upon the liquid being pumped.

Figure 4:
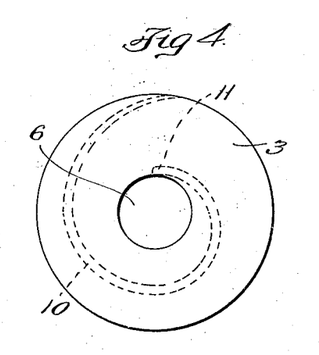
Figure 5:
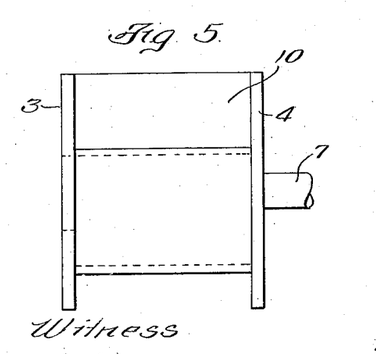

It is known to those skilled in the art that the effect of a single vane upon the liquid may be improved by spiral disposition of the vane, as illustrated in Figures 4 and 5. In this case the side plates 3 and 4 have disposed between them a vane 10 which may be considered as generated by a line parallel to the axis of the shaft 7 moving in the path of the spiral to a point tangent to the opening 6 and given a fusiform shape. By running the impeller shown in Figures 4 and 5 in a counter clockwise direction, as viewed in Figure 4, the impeller secures a better hold on the water and tends to give a somewhat better balanced mechanical construction.

It has, however, a single hydraulic outlet and this even though it appears to be distributed entirely around the periphery has inevitably an unbalanced hydraulic effect.

Now, by taking this impeller shown in Figures 4 and 5 and giving it a twist of say 360°, that is, twisting the plate 4 360° with respect to the plate 3, or vice versa, it can be seen that the outlet of the twisted vane 10a is thereby disposed circumferentially about the impeller.

Such impeller is, however, not inherently free of clogging since fibrous material can be hung across the front edge 11 in Figures 4 and 5, and will tend to clog the impeller. Naturally the helical edge 11a will tend to shift such fibrous material off to one side, that is, off to the right, as viewed in Figure 6, but there is no inherent capacity to avoid hanging of fibrous material in the corner between the inner edge 11a and the side plate 4.

This fact holds true whether the side plates 3, 4 are plane or warped surfaces.

Figure 6:
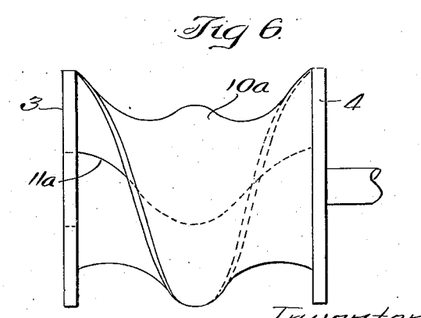
Figure 7:
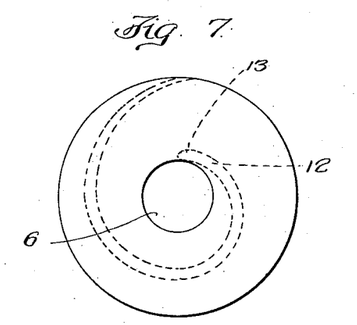
Figure 8:
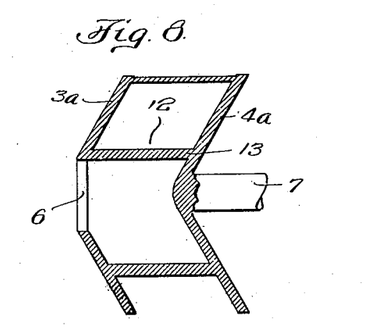

The side plates may be made conical or frustro-conical, as shown in Figures 7 and 8. In this case the side plates 3a and 4a are like the side plates shown in Figures 1 to 6 except that they are conical.

The vane 12 of the spiral form is disposed between the plates 3a and 4a, as shown in Figures 4 and 5. The corner where the inner end 13 of the vane 12 intersects the side wall 4a now becomes an obtuse corner instead of the right angle which is formed in Figures 4 and 5.

Now consider that the side plates 3a and 4a are given a full twist with respect to each other. For example, view the impeller from the shaft end and assume that the side plate 3a is held stationary and the side plate 4a is given a complete clockwise turn thereby warping the vane 12, a continuous circumferential discharge may be secured and the angle still further opened up between the inner edge 13 of the vane and the conical side wall 4a.

In this proposed construction based on Figures 7 and 8 where the vane is given a twist, as explained in connection with Figures 3 and 6, it will be seen that we now approach the form of impeller in which there is a continuous single discharge outlet disposed peripherally about the entire impeller, and at the same time there is a definite tendency to free any fibrous material from the edge of the vane.

Figure 9:
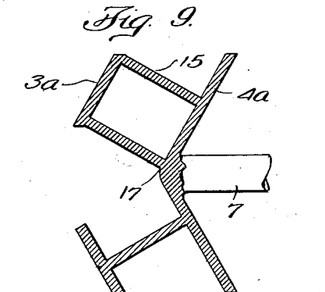
Figure 10:
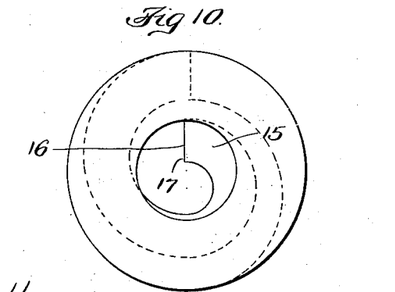

If now we consider disposing the vane substantially normal to the walls 3a and 4a, as shown in Figures 9 and 10, to produce the vane 15, it can be seen that the corner which the advance edge 16 makes with the conical rear wall 4a offers a minimum lodgment for fibrous material and the like.

If now the form shown in Figures 9 and 10 be given a twist as, for example, a complete revolution, or part of a complete revolution of the side plate 4a with respect to the side plate 3a and the vane 15 warped thereby so as to open out the angle between the inner end of the vane and the back side plate, it will be seen that the junction point 17 where the advance edge 16 of the vane 15 joins the central part of the conical side wall 4a now affords substantially no lodgement for fibrous material since any material which will hang over the advance edge 16 will be automatically washed towards the junction point 17 and the overhang of such fibrous material on the one side becomes impossible since the length of the said one side disappears substantially in the point of the cone formed by the rear side wall 4a to which the driving shaft 7 is attached. At the same time by the said twist the outlet is disposed about the entire periphery giving the desired hydraulic balance.

Figure 11:
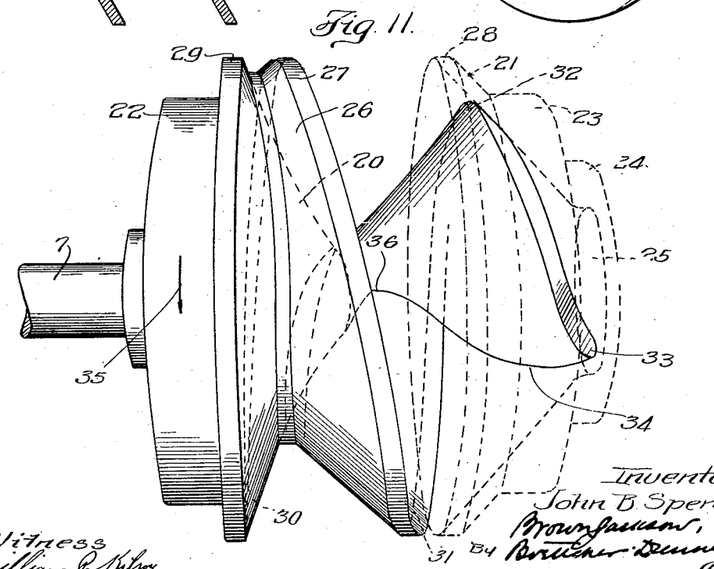
Figure 11 is a side view of the vane shown as attached to the rear conical plate and with the front conical plate shown in dotted lines.

Figure 11 illustrates the complete form of one embodiment of my invention. It comprises the companion side walls 20 and 21 having companion convex and concave surfaces, the side wall 20 being the inner side wall to which the driving shaft 7 is connected. The inner conical side wall 20 has a ring of metal 22 formed integral therewith, this ring of metal 22 being adapted to be drilled for static and dynamic balancing. Likewise, the forward wall member 21 has an integral ring 23 of metal for like purposes. The outer peripheral surfaces of these rings 22 and 23 may cooperate with the casing to form sealing off shoulders.

The hollow conical front plate is provided with a reduced boss or hub 24 which contains the inlet opening 25 for the impeller. Between the forward and the rear side wall members 21 and 22 is disposed the vane 26. This vane extends out radially along its margin 27 flush with the flanges 28 and 29 of the forward and rear walls 21 and 20. These surfaces 27, 28 and 29 are preferably machined to the same radial dimension and in fact the entire outside of the impeller is machined in the preferred construction.

The vane 26 is shown in full lines in Figure 11 and the front plate 21 is shown in dotted lines. It will be observed that the vane 26 makes substantially two complete turns about the axis of the impeller starting, as will be observed, at reference numeral 30 in Figure 11 and continuing up along the left hand side, as shown in dotted lines, for 180°, the dotted lines showing the outer edge of the vane which gradually merges into the rear conical plate 20. From the top downward in full lines another 180° is shown, making one complete turn. From that point the edge of the impeller on the back side is shown at dotted lines beginning at reference numeral 31 and continuing up to reference numeral 32 in Figure 11, through another 180°. The vane now is partially cut off by intersection with the inner conical surface of the forward plate 21. From the point indicated by reference numeral 32 the edge of the vane is shown in full lines down to its end at 33. This part makes substantially another 180°. The impeller, therefore, makes a total of two complete turns, although, obviously, this is capable of modification within my invention.

The forward edge 34 of the vane 26 is a compound curve extending from the point 33 to substantially the peak of the conical wall 20. Now it can be seen that fibrous material which might tend to overhang both sides of the advance edge 34 will be carried towards the rear conical wall 20 by the inflow of liquid and even if such fibrous material should sufficiently overhang both sides of the edge or advancing margin 34 of the vane 26, the shifting of said fibrous material along the edge 34 to the left causes the overhang of any fibrous material on the concave or inner side to lose its hold as the same is subjected to a component of flow of liquid at the inner end of the advance edge or margin 34 which throws such fibrous material to the opposite or outside surface of the vane 26. It may be considered that the advancing edge 34 near the point 33 provides a lodgment for fibrous material because this advancing edge has movement with respect to liquid on both its inside and its outside surfaces. However, there is an inward component of flow which tends to shift such fibrous material along said margin toward the point 36. The advance edge makes a small or acute angle with respect to the liquid flow so that the dislodging tendency is controlling. At the point 36 the dislodging effect is a maximum and the inner surface along which the material might have lodged has disappeared in the tip of a conical pocket which opens at the outside of the vane 26.

Numerous experiments with this type of impeller in pumping fibrous solids such as pieces of rope, rags, and the like, show that the impeller is completely non-clogging in its character.

Figures 11, 12, 13 and 14 show an impeller in which it will be observed the vane 26 is straight in cross section. That is to say, it may be considered as generated by a straight line rotated about the axis of the shaft tangent to a helix. This will be the type of vane where the rate of radial advance is uniform. That is to say, consider the vane 12 shown in Figure 7, such a vane may have either a uniform outward throw or it may have an increasing outward throw within the limits of design. If the increment of outward throw per angle of rotation is uniform, the vane will be straight in cross section. If, however, the rate of throw increases, the vane will then be curved. The impeller shown in Figures 11, 12, 13 and 14 has such a straight vane whereas the impeller shown in Figures 15, 16, 17 and 18 has the curved vane.

Figure 12:
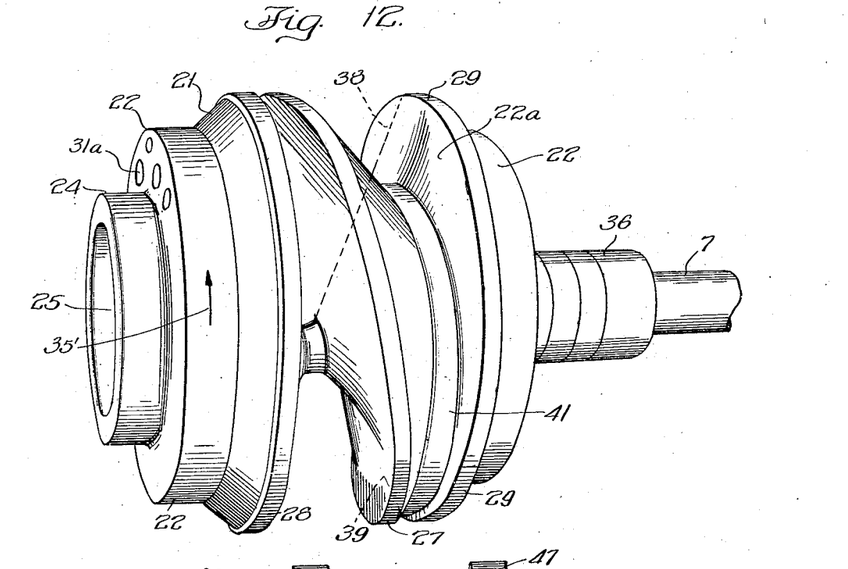
Figure 12 is an isometric view of the completed impeller shown in Figure 11.

The impeller shown in Figure 11 is to be rotated in the direction shown by the arrow 35 at the left of the figure. The shaft 7 is shown in Figure 12 as having a sleeve 36 which is secured to the hub 7, said sleeve 36 cooperating with a suitable packing gland to close the joint between the impeller and the casing. A hollow bearing sleeve lies between the shaft 7 and the tubular extension 36 for supporting a bearing within the rear conical plate 20 of the impeller, all as is more fully described in my copending application.

The opening of the inlet 25 to the outside surface of the vane 26 is clear in Figure 11. The direction of motion of the impeller shown in Figure 12 is indicated at the left by the arrow 35'.

Figure 12 is a photographic view and, hence, not an accurate isometric drawing. I have added the dotted lines 39 and 38 in Figure 12 to indicate the conical character of the rear plate 20.

Figures 13, 16:
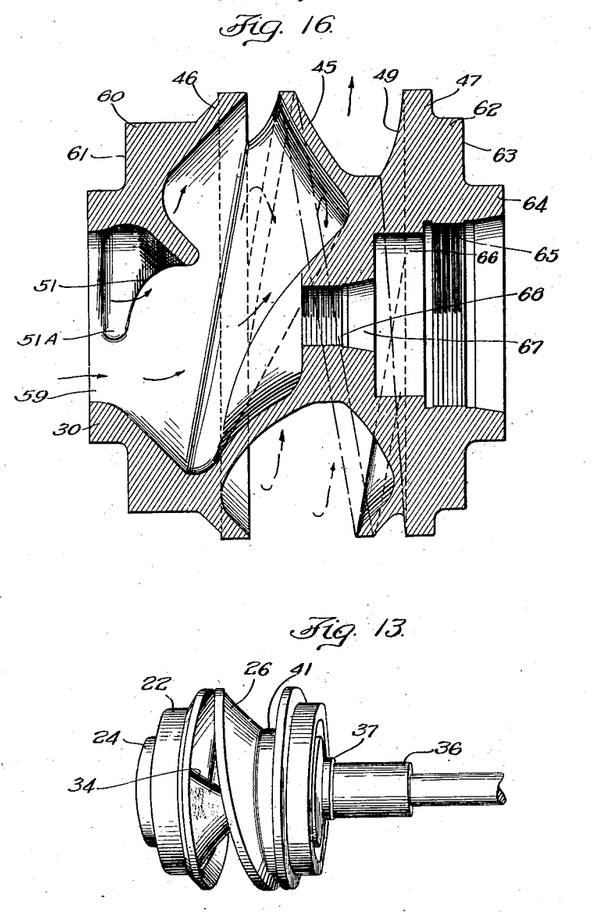
Figure 13 is a photographic isometric view on a smaller scale of the impeller shown in Figure 12.
Figure 16 is a section taken on line 16—16 of Figure 15.
Figure 14:
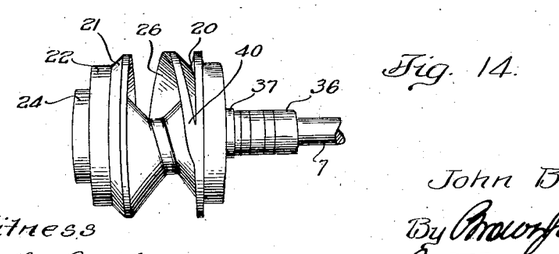
Figure 14 is a similar photographic side view of the impeller of Fig. 13, this view being taken on substantially the opposite side from that shown in Figure 13.
Figure 15:
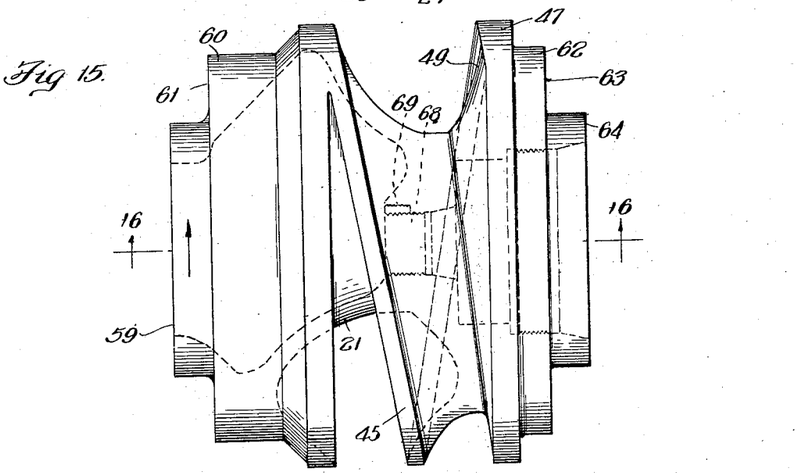
Figure 15 is a side view of a form of impeller having an increasing outward throw of the vane.

Figures 13 and 14 likewise are photographic views of the same type of impeller taken from different angles to illustrate the character of the impeller. In Figure 14 the intersection of the vane 26 with the rear conical plate 20 is plainly indicated at 40. The opposite termination of the vane is within the concave side of the forward conical plate 21 and, hence, is difficult to illustrate in the elevational views. In Figure 13 the advance edge 34 of the impeller is plainly shown.

The intersection of the vane 26 with the front and rear walls is not permitted to be at a sharp angle, but a suitable fillet as indicated generally at 41 is employed thereby avoiding any sharp angular pockets which would be difficult to cast and difficult to keep clean.

Figure 17:
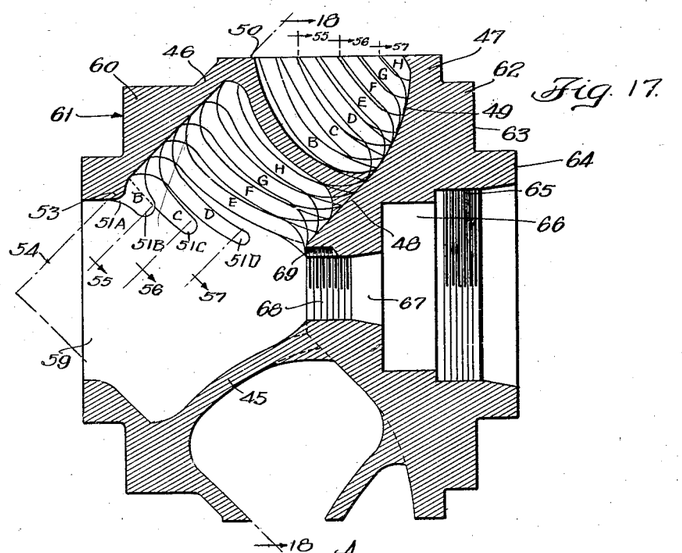
Figure 17 is a longitudinal section through the impeller on line A—E of Figure 18.
Figure 18:
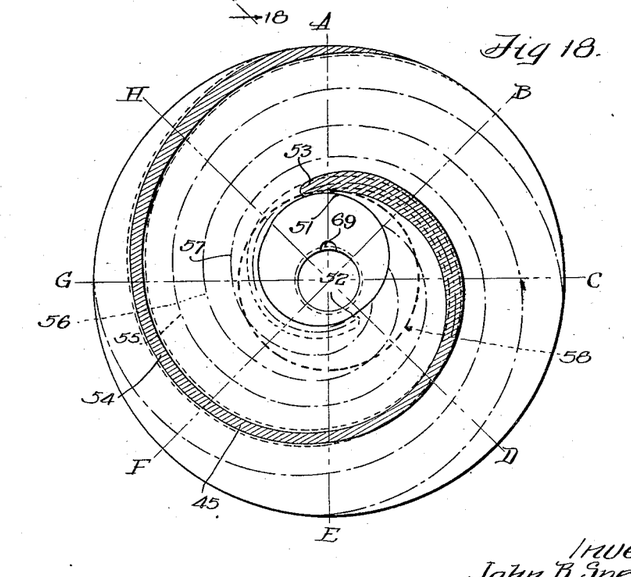
Figure 18 is a transverse section through the vane taken on substantially line 18—18 of Figure 17.

Referring now to Figures 15, 16, 17 and 18, I have illustrated an impeller in which the outward throw of the blade is accelerated with the result that the vane instead of being straight in cross section is curved in cross section, that is, it becomes a double warped surface. By considering the cross sectional diagram of Figure 18 showing the vane 45 in cross section, it can be seen that this vane has an increasing rate of throw per unit of angular change. The vane is disposed between the front wall 46, the inside concave surface of which makes an angle of approximately 45° with the longitudinal axis of the impeller, and the rear wall 47 which has a frustro-conical central portion, as indicated at 48 in Figure 17. The outer part of the rear wall 47 is curved as indicated at 49 on a radius struck from the point 50, which lies substantially on the nearest peripheral edge of the forward wall 46. The specific construction is, of course, optional and may be varied to suit pumping conditions.

The section of Figure 18 is taken substantially on a line such as 18—18 of Figure 17, disregarding the fillet where the vane joins the front and rear walls. The section of Figure 17 is taken on the line A—E of Figure 18 and shows a true section through the vane and through the front and back walls.

It will be seen by reference to Figures 17 and 18 that the advance edge 51 extends substantially through 180°, that is, from the point indicated at 52 where the inner end of the advance edge 51 merges into the back plate 47 to the point 53 where the advance edge 51 intersects the front wall 46. This means that the vane requires a twist of only 180° to give a resulting double wrap of the edge of the vane about the impeller. Incoming solids such as fibrous material which might overhang the advance edge at the point 53 are naturally scoured along said line 51 down to the point 52 where said advance edge 51 makes an obtuse angle with the rear wall 47 and the possible overhang of fibrous material on the inside of the edge 51 becomes substantially zero.

I have shown in the upper part of Figure 17 the various sections on the lines B, C, D, E, F, G, and H to the center to indicate the sections upon said lines. The dot and dash lines of spiral form indicated at 54, 55, 56 and 57 on Figure 18 correspond to the center lines of the sections which would be secured by successive sections on corresponding section lines as indicated on Figure 17. The dotted circle 58 shown in Figure 18 indicates the outline of the inlet opening 59 on Figure 17.

The front wall 46 is provided with the circular shoulder 60 which may be drilled on its face 61 for dynamic and static balance. Likewise, the shoulder 62 shown in Figure 17 on the rear wall 47 may be drilled on its face 63 for assisting in securing static and dynamic balance.

This operation of balancing the impeller may be performed in connection with the use of any of the well known machines for this purpose. The rear hub 64 of the impeller is threaded at 65 to receive a tubular extension, such as 36, for providing a seal in conjunction with a suitable packing gland mounted on the housing. The recess 66 is adapted to receive the outer race of a suitable roller bearing, the inner race of which rests upon a tubular bracket embracing the shaft, said shaft being threaded into the axial conical pocket 67 by engagement with the threads 68. The shaft may be locked in position by a grub screw or the like seated in the recess 69. This construction is shown in my aforesaid copending application.

Whereas I speak of the impeller as making two complete wraps about the axis, I wish to point out that this is not strictly essential and may be varied within the invention.

This form of impeller, like that shown in Figures 11 and 12, is preferably machined on all of its outer peripheral surfaces. The vane except on its cylindrical peripheral edge is not machined but should be smooth.

It is to be observed that the opening through the impeller is large and opens out peripherally through an opening substantially as large as the inlet opening. In Figure 16 the impeller is to be rotated so as to advance the point 51a downwardly as viewed in that figure.

The arrows shown in Figure 16 indicate in general the relative direction of flow of liquid through the impeller.

The impeller may be considered as being generated by disposing an inclined vane, such as 15, shown in Figure 9, between the two conical side walls 3a and 4a, then cutting such vane 15 into conical laminæ parallel to the boundary walls of the front and rear plates 3a and 4a and then slipping or angularly advancing the laminæ with respect to each other to obtain the twist effect previously mentioned. Thus by having the impeller make one complete wrap, as shown in Figure 10, and then slipping the laminæ with respect to each other for another turn, or a part of a turn, the impeller may be considered as generated.

With the above explained construction the impeller may be trimmed by machining and the complete wrap of the outlet opening is not materially changed. The impeller provides a longer water passage and the conical effect keeps the longer passageway with large, free openings for securing the desired non-clogging effect.

I do not intend to be limited to the details shown and described nor do I intend to be limited to the specific structure or the mode of generating the same herein described, as numerous embodiments of the invention may be constructed within the teaching of my invention embodying one or more of the novel features herein described and claimed.

I claim:

1. An impeller for centrifugal pumps comprising, in combination, two substantially conical side members, and a single vane substantially helicoidal in form lying between said members, the outer portion of the vane making approximately a complete wrap about the outer periphery of the impeller.

2. An impeller for centrifugal pumps comprising, in combination, a body of circular cross section and having side members, and a single vane substantially helicoidal in form extending about the body and defining therewith a substantially spiral outlet passage.

3. An impeller for centrifugal pumps comprising, in combination, two substantially conical side members and a single vane substantially helicoidal in form supported by the members and extending about the impeller axis, the longitudinal pitch of the vane being such that said vane makes approximately one complete wrap about the outer peripheral face of the impeller.

4. An impeller for centrifugal pumps comprising, in combination, two substantially conical side members and a single vane substantially helicoidal in form extending about and between said members, said vane making approximately two complete wraps about the impeller axis, and weight members carried by the side members and disposed to effect dynamic balancing of the impeller.

5. An impeller for centrifugal pumps comprising in combination, two side members, and a wall joining said side members and forming a single passage, the outer portion of said wall so formed that said passage discharges approximately equally at all sections of the periphery of the impeller.

6. An impeller for centrifugal pumps comprising in combination a disc and a wall supported on said disc and forming a single passage, the outer portion of said wall so formed that said passage discharges proportionally at all sections of the periphery of the impeller.

7. An impeller for a centrifugal pump comprising side plates one of which has an inlet opening and a single vane disposed between them, said vane having its outer margin helically disposed about the periphery of the impeller.

8. An impeller for a centrifugal pump comprising side plates having concave and convex facing surfaces, one of said plates having an axial inlet opening and a helicoid vane disposed between said plates.

9. In an impeller a helicoid vane bounded by two complementary convex and concave surfaces on its ends and by a cylinder on its periphery.

10. In an impeller a single warped spiral vane bounded axially by complementary convex and concave surfaces of revolution and bounded peripherally by a right cylinder.

11. In an impeller a single relatively thin helicoid vane bounded axially by complementary convex and concave surfaces of revolution, said vane in cross section normal to its longitudinal axis being disposed on a spiral and in longitudinal axial cross section being disposed on a line at an angle to the axis.

12. In an impeller for centrifugal pumps, a pair of side plates, a single vane connecting said side plates, the outer edge of said vane forming a helix between said side plates.

13. In an impeller for centrifugal pumps, a pair of side plates, a single spiral vane between said side plates, the outer edge of said vane forming a helix between the side plates.

14. In an impeller for centrifugal pumps, a pair of side plates having complementary facing concave and convex surfaces, the plate with the concave surface having an axial inlet opening, and a single vane disposed between said surfaces, said vane having an inner or advancing edge extending from a point substantially tangent to the inlet opening to substantially the center of the convex surface, the outer or trailing edge of the vane forming a helix extending from the concave surface to the convex surface.

15. In an impeller for centrifugal pumps, a pair of side plates having complementary facing concave and convex surfaces, the plate with the concave surface having an axial inlet opening, and a single vane disposed between said surfaces, said vane having an inner or advancing edge extending from a point substantially tangent to the inlet opening to substantially the center of the convex surface, the outer or trailing edge of the vane forming a helix extending from the periphery of one surface to the periphery of the other surface, said outer edge being a cylindrical helix and the inner edge being a helix of decreasing diameter from concave to convex surface.

16. An impeller for centrifugal pumps comprising, in combination, side walls, two opposed substantially conical members extending inwardly of the impeller axially thereof and from the inner faces of the side walls, said members tapering inwardly and being joined together at their smaller ends, one of the side members having an intake port coaxial with the impeller and the conical member extending therefrom being defined by a spiral vane extending from said port, the smaller end of the vane being at the port, and a substantially helicoidal vane extending about the conical members as a continuation of the spiral vane and forming therewith a spiral passage the inner radius of which increases from the intake port side of the impeller to the other side thereof.

17. An impeller for centrifugal pumps comprising, in combination, a body provided at one side with an axial intake port, and a single spiral passage extending about the body from the intake port side thereof to the other side of the body, the exterior radius of the inner wall of the passage radially of the body increasing with the distance of the different portions of said passage away from said port.

18. An impeller for centrifugal pumps comprising, in combination, a body provided at one side with an axial intake port, and a spiral passage extending about the body from the intake port side thereof to the other side of the body, the exterior radius of the inner wall of the passage radially of the body increasing with the distance of the different portions of said passage away from said port, the outer side of the passage taken radially of the impeller being open.

19. An impeller for centrifugal pumps comprising, in combination, two side walls and substantially conical side members extending inwardly from the walls axially of the impeller, said members tapering inwardly and being joined at their inner ends, a vane substantially helicoidal in form extending about said members and defining therewith and with the side walls a substantially spiral passage, and discs carried by the side walls and providing weight members which afford means for effecting dynamic balancing of the impeller.

20. An impeller for centrifugal pumps comprising in combination, two substantially conical side members, and a single passage formed by a wall joining said side members, the outer portion of said wall so formed that it makes approximately a complete wrap about the outer periphery of the impeller.

21. An impeller for centrifugal pumps comprising in combination, two side members, and a wall joining said side members and forming a single passage, the outer portion of said wall so formed that said passage discharges proportionally at all sections of the periphery of the impeller.

22. An impeller for centrifugal pumps comprising in combination a disc and a wall supported on said disc and forming a single passage, the outer portion of said wall so formed that said passage discharges approximately equally at all sections of the periphery of the impeller.

23. In a pump, an impeller having an axial inlet passageway and a communicating conical divergent space and having a single impeller vane with an advanced edge diagonally disposed across the space and providing a single discharge passageway discharging about the entire periphery of the impeller.

24. A pump impeller having a longitudinal axis upon which it is adapted to be rotated, a pair of end members providing complementary concave and convex walls, one member having an axial inlet passage, the wall of which inlet passage merges with the concave wall, said members defining between them a divergent annular space communicating with the opening of the inlet passageway and a single warped vane disposed in a spiral between said concave and convex walls of said end members, the vane having more than one turn about the axis of the impeller.

25. A pump impeller having a longitudinal axis upon which it is adapted to be rotated, a pair of end members providing complementary concave and convex walls, one member having an axial inlet passage, the wall of which inlet passage merges with the concave wall, said members defining between them a divergent annular space communicating with the opening of the inlet passageway and a single warped vane disposed in a spiral between said concave and convex walls of said end members, the vane having more than one turn about the axis of the impeller, the pitch of the turns of the vane being substantially equal to the diameter of the inlet passageway in order to pass any object which may enter the inlet passageway.

26. In a pump, an impeller comprising a rotatable vane disposed between two side plates, one of the side plates having an axial inlet opening, the vane defining a single passageway from the inlet to the periphery of the impeller, the outer edge of the vane defining a helix between the side plates.

27. The method of pumping which comprises confining a body of water in a hollow, divergent mass, cutting said body into a continuous strip, wrapped more than once about the axis of the mass, simultaneously pressing axially upon one edge of the entire strip and whirling the strip about the axis to develop centrifugal force, and discharging the mass about the entire periphery of the strip.

28. The method of pumping which comprises cutting an approximately cylindrical body of water into a single continuous coiled strip having at least one turn about the axis of the body, pressing upon the edge of the strip in an axial direction and simultaneously whirling the body about its axis to develop centrifugal force throughout the strip, moving the water of the body outwardly tangentially and introducing water axially of the body to replace that thrown outwardly.

29. The method of pumping which comprises forming a single continuous strip of water coiled at least one turn about a lineal axis, pressing upon the edge of the strip in an axial direction and simultaneously whirling the strip about the said axis to develop centrifugal force throughout the strip, moving the water of the strip outwardly tangentially and introducing water axially of the body to replace that thrown outwardly.

In witness whereof, I hereunto subscribe my name this 8th day of May, A. D. 1929.

JOHN B. SPERRY.